US012027161B2

(12) United States Patent
Shiramizu et al.

(10) Patent No.: US 12,027,161 B2
(45) Date of Patent: Jul. 2, 2024

(54) DIALOGUE DEVICE

(71) Applicant: NTT DOCOMO, INC., Chiyoda-ku (JP)

(72) Inventors: Yutaro Shiramizu, Chiyoda-ku (JP); Kousuke Kadono, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 886 days.

(21) Appl. No.: 16/981,743

(22) PCT Filed: Apr. 5, 2019

(86) PCT No.: PCT/JP2019/015216
§ 371 (c)(1),
(2) Date: Sep. 17, 2020

(87) PCT Pub. No.: WO2019/211967
PCT Pub. Date: Nov. 7, 2019

(65) Prior Publication Data
US 2021/0035579 A1   Feb. 4, 2021

(30) Foreign Application Priority Data

May 1, 2018   (JP) .................................. 2018-088222

(51) Int. Cl.
*G10L 15/22*     (2006.01)
*G06F 16/9035*   (2019.01)
(Continued)

(52) U.S. Cl.
CPC .......... *G10L 15/22* (2013.01); *G06F 16/9035* (2019.01); *G06F 16/9038* (2019.01); *G10L 15/02* (2013.01); *G10L 15/28* (2013.01)

(58) Field of Classification Search
None
See application file for complete search history.

(56) References Cited

U.S. PATENT DOCUMENTS 6,385,582 B1 * 5/2002 Iwata ...................... G10L 15/22
704/E15.04
8,670,979 B2 * 3/2014 Gruber ................ G06F 16/3329
704/4

(Continued)

FOREIGN PATENT DOCUMENTS

JP         2013-12012 A     1/2013

OTHER PUBLICATIONS

International Preliminary Report on Patentability and Written Opinion issued Nov. 12, 2020 in PCT/JP2019/015216, (submitting English translation only), 9 pages.

(Continued)

*Primary Examiner* — Neeraj Sharma
(74) *Attorney, Agent, or Firm* — Oblon, McClelland, Maier & Neustadt, L.L.P.

(57) ABSTRACT

A dialogue device according to an embodiment includes an acquisition unit configured to acquire a user utterance input by the user, an identification unit configured to identify a situation of the user utterance as an utterance situation, a selection unit configured to select a scenario corresponding to the user utterance from a database storing a plurality of scenarios, and an output unit configured to output a system utterance defined by the selected scenario. Each scenario defines a user utterance, a system utterance for the user utterance, and hierarchically defined scenario attributes. When two or more scenarios defining a user utterance are present as candidate scenarios in a database, the selection unit selects one scenario from the two or more candidate scenarios based on a hierarchical relationship among the two or more scenario attributes defined in the two or more candidate scenarios and the utterance situation.

6 Claims, 6 Drawing Sheets

(51) Int. Cl.
  *G06F 16/9038* (2019.01)
  *G10L 15/02* (2006.01)
  *G10L 15/28* (2013.01)

(56) References Cited

U.S. PATENT DOCUMENTS

| | | | | |
|---|---|---|---|---|
| 10,179,287 | B2* | 1/2019 | Stacy | A63F 13/60 |
| 10,600,406 | B1* | 3/2020 | Shapiro | G10L 15/22 |
| 10,775,795 | B2* | 9/2020 | Tanaka | G10L 15/1815 |
| 10,839,042 | B1* | 11/2020 | Dias | G06F 16/906 |
| 10,984,034 | B1* | 4/2021 | Sandland | G10L 15/183 |
| 11,238,855 | B1* | 2/2022 | Goetz | G10L 13/00 |
| 2011/0144999 | A1* | 6/2011 | Jang | G06V 40/70 |
| | | | | 704/270.1 |
| 2017/0293610 | A1* | 10/2017 | Tran | G06Q 10/109 |
| 2018/0301150 | A1* | 10/2018 | Woo | G06F 3/04842 |
| 2019/0147849 | A1* | 5/2019 | Talwar | G06N 3/02 |
| | | | | 704/258 |
| 2019/0332948 | A1* | 10/2019 | Dhondse | G06F 16/24534 |
| 2020/0068352 | A1* | 2/2020 | Yamada | H04W 4/029 |

OTHER PUBLICATIONS

International Search Report issued Jun. 11, 2019 in PCT/JP2019/015216 filed Apr. 5, 2019.

* cited by examiner

Fig. 3

| Scenario | |
|---|---|
| SCENARIO A1 | `<topic name = "MALE * *">`<br>`<category>`<br>`<pattern>Good morning</pattern>`<br>`<template>Good morning, sir</template>`<br>`</category>`<br>`<category>`<br>`<pattern>Hello</pattern>`<br>`<template>Hello</template>`<br>`</category>`<br>`...`<br>`</topic>` |
| SCENARIO A2 | `<topic name = "MALE 20-39 *">`<br>`<category>`<br>`<pattern>Good morning</pattern>`<br>`<template>Good morning</template>`<br>`</category>`<br>`</topic>` |
| SCENARIO A3 | `<topic name = "MALE * SUNNY">`<br>`<category>`<br>`<pattern>Good morning</pattern>`<br>`<template>Good morning. It's good weather.</template>`<br>`</category>`<br>`</topic>` |

| | 31 |
|---|---|
| SCENARIO B1 | `<topic name = "MALE * *">`<br>`<category>`<br>`<pattern>Where am I now?</pattern>`<br>`<template>Somewhere</template>`<br>`</category>`<br>...<br>`</topic>` |
| SCENARIO B2 | `<topic name = "MALE <PARK NAME> *">`<br>`<category>`<br>`<pattern>Where am I now?</pattern>`<br>`<template>Park</template>`<br>`</category>`<br>`</topic>` |

DIALOGUE DEVICE

TECHNICAL FIELD

An aspect of the present invention relates to a dialogue device.

BACKGROUND ART

A mechanism is known that advances an automatic dialogue executed with a user according to the situation. For example, Patent Literature 1 describes a dialogue rule changing device that can change dialogue rules of a dialogue agent system according to a user's preferences.

CITATION LIST

Patent Literature

[Patent Literature 1] JP 2013-12012 A

SUMMARY OF INVENTION

Technical Problem

In order to advance an automatic dialogue flexibly according to the situation, it is necessary to prepare scenarios (rules) corresponding to various situations. It is not however easy to prepare a sufficient number of scenarios in advance. A mechanism is therefore desired that can realize a flexible automatic dialogue while reducing the burden of the scenario preparation.

Solution to Problem

A dialogue device according to an aspect of the present invention includes an acquisition unit configured to acquire a user utterance input by a user; an identification unit configured to identify a situation of the user utterance as an utterance situation; a selection unit configured to select a scenario corresponding to the user utterance from a database storing a plurality of scenarios, each of the plurality of scenarios defining a user utterance, a system utterance for the user utterance, and hierarchically defined scenario attributes; and an output unit configured to output the system utterance defined by the scenario selected by the selection unit, wherein, when two or more scenarios defining the user utterance acquired by the acquisition unit are present as candidate scenarios in the database, the selection unit selects one scenario from the two or more candidate scenarios based on a hierarchical relationship among the two or more scenario attributes defined in the two or more candidate scenarios and the utterance situation.

In such an aspect, when there are a plurality of scenarios in which the same user utterance is defined, one scenario is selected based on a situation of the user utterance and individual scenario attributes, and the system utterance is output according to the selected scenario. It is therefore possible to realize a flexible automatic dialogue according to the situation of the user utterance. In addition, for prepared scenarios, since it suffices to define a correspondence relationship among the user utterance, the system utterance, and the scenario attributes, it is possible to reduce the burden of scenario preparation.

Advantageous Effects of Invention

According to an aspect of the present invention, it is possible to realize a flexible automatic dialogue while reducing the burden of scenario preparation.

BRIEF DESCRIPTION OF DRAWINGS

FIG. 3 is a diagram illustrating an example of scenarios.

FIG. 4 is a diagram illustrating another example of scenarios.

DESCRIPTION OF EMBODIMENTS

Figure 1:
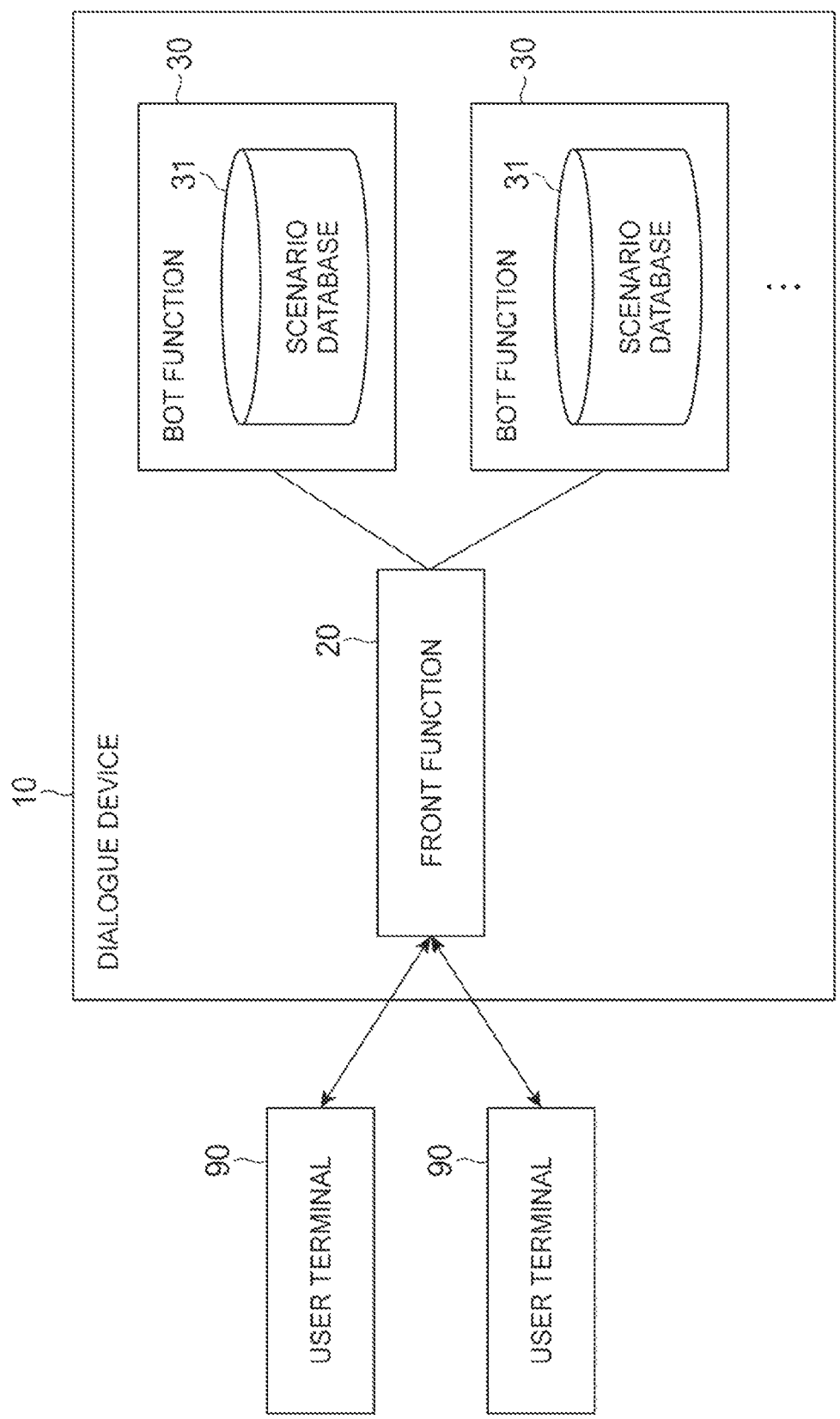
FIG. 1 is a diagram illustrating an example of a functional configuration of a dialogue device according to an embodiment.

Hereinafter, embodiments of the present invention will be described in detail with reference to the accompanying drawings. In the description of the drawings, the same or equivalent elements are denoted by the same reference numerals, and redundant description thereof will be omitted.

A dialogue device is a computer that executes an automatic dialogue with a user. A user is a person who uses a dialogue device. The automatic dialogue is an exchange of conversation between the user and the computer (this computer is generally referred to as a "bot"). In the automatic dialogue, the computer automatically utters in response to an utterance from the user. An utterance is one unit of speech that is spoken by the user or the computer. Hereinafter, an utterance of the user is also referred to as a "user utterance", and an utterance of the computer is also referred to as a "system utterance".

Applications of the dialogue device are not limited. For example, the dialogue device may be used in a frequently asked questions (FAQ) system that answers questions of a user, or may be used in a chat system that performs arbitrary talking that is not limited to FAQs. Alternatively, the dialogue device may be incorporated in a virtual assistant function for executing arbitrary tasks based on a voice operation.

The dialogue device may be a part of a client-server type system or may be a single device. In the embodiment, it is assumed that the dialogue device is a computer that functions as a server. FIG. 1 is a diagram illustrating an example of a functional configuration of the dialogue device 10 according to the embodiment. The dialogue device 10 can be connected to at least one user terminal 90 via a communication network. A configuration of the communication network is not limited at all, and may be configured using, for example, at least one of the Internet and an intranet.

The user terminal 90 is a computer (a client terminal) that is operated by a user. The user terminal 90 has a function of transmitting an utterance (user utterance) input by the user to the dialogue device 10 and a function of outputting an utterance (system utterance) received from the dialogue device 10. A type of the user terminal 90 is not limited, and may be, for example, a stationary computer or device or may be a portable computer or device. Specific examples of the user terminal 90 include, but are not limited to, a smartphone, a tablet terminal, a wearable terminal, a personal computer, a smart speaker, a smart TV, and a smart home appliance.

When the dialogue device 10 receives the user utterance from the user terminal 90, the dialogue device 10 determines a system utterance corresponding to the user utterance based on the scenario, and transmits the determined system utterance to the user terminal 90. The scenario is data defining rules for a dialogue (rules defining what kind of system utterance is output according to which kind of user utterance is accepted). One of features of the dialogue device 10 is configuration and selection of a scenario for outputting a system utterance corresponding to a situation in response to a certain user utterance. Hereinafter, the features will be described particularly in detail.

As illustrated in FIG. 1, the dialogue device 10 includes, as functional elements, a front function 20 for comprehensively controlling automatic dialogue, and one or more bot functions 30 for outputting system utterances regarding a specific topic. The front function 20 determines a bot function 30 for processing user utterances received from the user terminal 90, and transfers the user utterances to the bot function 30. Thereafter, the front function 20 transmits a system utterance output from the bot function 30 to the user terminal 90 as a response. Each bot function 30 determines a system utterance corresponding to a user utterance received from the front function 20 based on scenarios in a scenario database 31, and outputs the determined system utterance to the front function 20. It can be said that each bot function 30 is an expert agent having specific knowledge, and the front function 20 is a main agent that comprehensively controls one or more bot functions 30.

Figure 2:
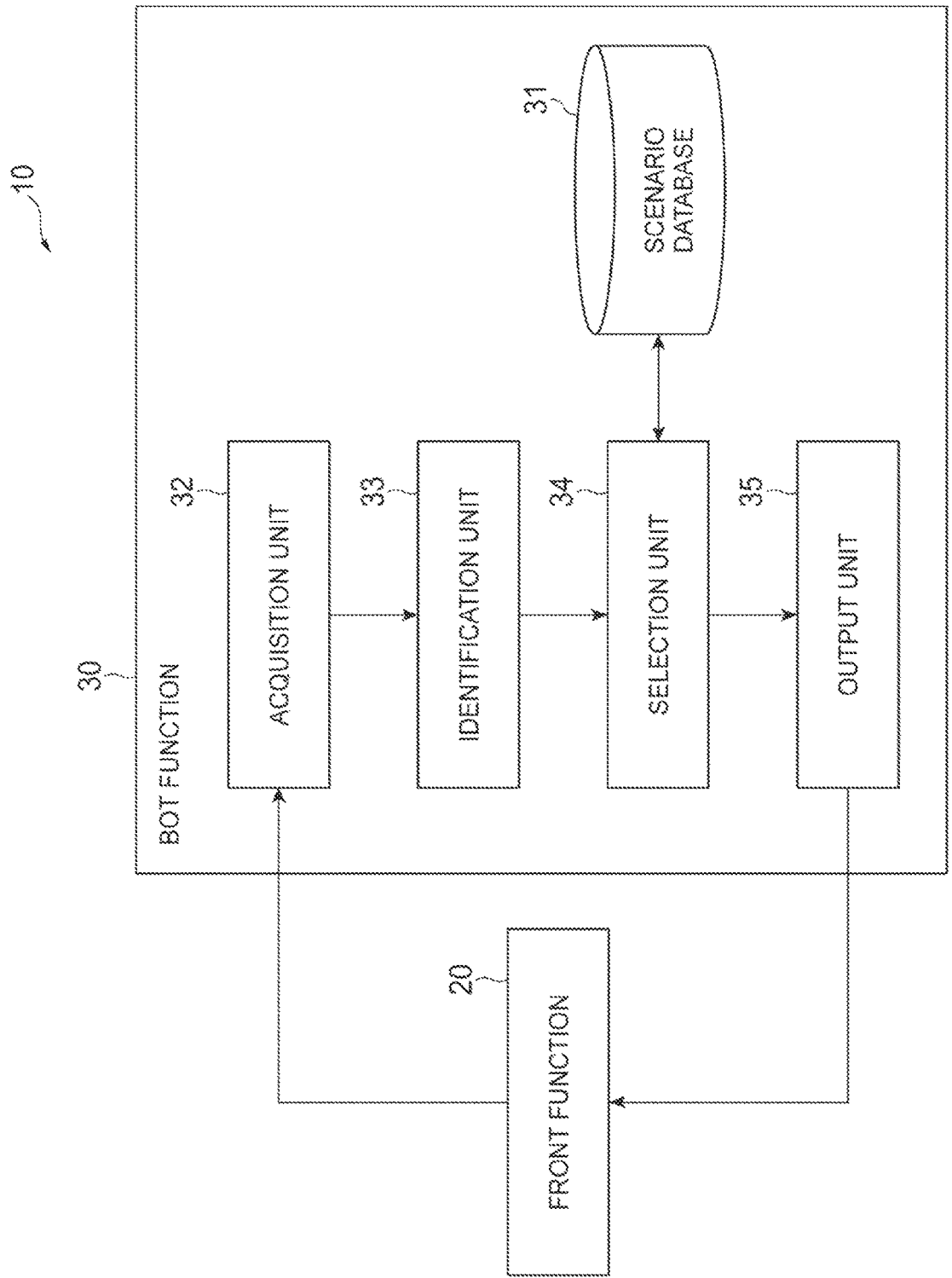
FIG. 2 is a diagram illustrating an example of a functional configuration of a bot function illustrated in FIG. 1.

FIG. 2 is a diagram illustrating an example of a functional configuration of the bot function 30. In the embodiment, each bot function 30 includes the scenario database 31, an acquisition unit 32, an identification unit 33, a selection unit 34, and an output unit 35. The scenario database 31 is a database that stores a plurality of scenarios relevant to a specific topic. The acquisition unit 32 is a functional element that acquires a user utterance input by the user. The identification unit 33 is a functional element that identifies a situation of the user utterance as an utterance situation. The utterance situation (the situation of the user utterance) is a situation when the user utterance has occurred. For example, the utterance situation is a concept including at least one of user attributes and environmental information. The user attributes are information indicating a nature or features of the uttering user. Examples of the user attributes include, but are not limited to, a name, a sex, an age, and an address. The environmental information is information indicating a state of a world (a real world or a virtual world) when the user utterance occurs. Examples of the environmental information may include a time, weather, and a place. Further, an emotion of a bot controlled or determined by an algorithm of the bot function 30 is also an example of the environmental information. Of course, the environmental information is not limited to these. The selection unit 34 is a functional element that selects one scenario corresponding to the user utterance from the scenario database 31. The output unit 35 is a functional element that outputs a system utterance defined by the selected scenario.

As described above, the dialogue device 10 outputs a system utterance corresponding to a situation in response to a certain user utterance. In order to realize such a system utterance, the scenario database 31 stores a plurality of scenarios for at least one user utterance. The plurality of scenarios can be distinguished by scenario attributes. The scenario attributes are conditions for determining a system utterance that is a response to one user utterance. The scenario attributes can be defined by data items corresponding to the utterance situation, and thus, can be defined by data items corresponding to, for example, the user attributes or the environmental information.

FIG. 3 illustrates an example of a plurality of scenarios that can correspond to a user utterance "Good morning". In the embodiment, the scenario is assumed to be described by applying artificial intelligence markup language (AIML), but a method and rule for describing the scenario are not limited at all. Each scenario includes an element "topic name" indicating scenario attributes and one or more elements "category" indicating a basic unit of a rule (knowledge). Each "category" element includes a "pattern" element indicating the user utterance, and a "template" element indicating the system utterance in response to the user utterance. That is, each scenario defines the user utterance, the system utterance corresponding to the user utterance, and the scenario attributes.

Individual scenarios are distinguished by hierarchically defined scenario attributes (a "topic name" element). The term "hierarchically defined" is a relationship that is defined to include a certain n-th concept (n is a natural number), and a (n+1)-th concept that is included in the n-th concept and is more specific than the n-th concept. Any number of layers may be used as long as the number is equal to or greater than 2. Further, there may be a plurality of (n+1)-th concepts for a certain n-th concept. A hierarchically defined relationship can be rephrased with terms such as an "inheritance relationship", "override", or "parent-child relationship", or can include concepts represented by these terms. In the embodiment, it is assumed that the first layer indicates a most abstract concept, and the concepts become more specific as an ordinal number of the layer increases. For example, when the scenario attributes are defined in a first layer, a second layer, and a third layer, the first layer is a top layer and the third layer is a lowest layer.

In an example of FIG. 3, three scenarios A1, A2, and A3 that can correspond to the user utterance "Good morning" are illustrated. Scenario A1 is a scenario capable of corresponding to a plurality of user utterances including "Good morning", whereas scenarios A2 and A3 are scenarios specialized for the user utterance "Good morning".

In each of the three scenarios, the scenario attributes include three data items such as sex, age, and weather. In each data item, one value may be set, a range of values (for example, a numerical range) may be set, a superordinate concept (category) may be set, or a wild card indicating that an arbitrary value is accepted may be designated. When the scenario attributes include a plurality of data items, the respective data items are hierarchically defined, and as a result, the scenario attributes are hierarchically defined. Since the wild card is a concept including an arbitrary value, the wild card corresponds to a top layer (a first layer).

In scenario A1, a specific value "male" is designated for the sex, whereas a wild card "*" is designated for the age and the weather. Therefore, scenario A1 can be used regardless of the age and the weather when the sex corresponding to the utterance situation is "male". In scenario A2, the sex is "male", the age is 20 or more and 39 or less, and the weather is a wild card. In scenario A3, the sex is "male", the age is a wild card, and the weather is "sunny". Therefore, in scenarios A1, A2, and A3, it can be said that scenario A1 is the first layer and scenarios A2 and A3 are the second layer. For scenarios A2 and A3, scenario A3 is higher in terms of the age, but scenario A2 is higher in terms of the weather. Therefore, when the scenario attributes are considered as a whole, it is not possible to determine which of scenarios A2 and A3 is an upper layer.

Based on the scenario attributes defined hierarchically as described above, when the utterance situation of the user utterance "Good morning" corresponds to the scenario attributes including "male" and an age of 20 to 39, the system utterance "Good morning" may be output based on scenario A2. When this utterance situation corresponds to scenario attributes including "male" and "sunny", a system utterance "Good morning. It's good weather." can be output based on scenario A3. When this utterance situation corresponds to the scenario attributes including "male" but does not correspond to either scenario A2 or A3, the system utterance "Good morning, sir" is output based on scenario A1. Therefore, it can be said that scenario A1 is generally applied, whereas scenarios A2 and A3 are applied in a specific scene.

It is possible to easily prepare a set of scenarios according to various situations by introducing the hierarchically defined scenario attributes. In the example of FIG. 3, scenario A1 corresponding to the first layer indicates a general or general-purpose system utterance corresponding to a plurality of assumed user utterances. On the other hand, in scenarios A2 and A3 corresponding to the second layer, it suffices to define the scenario attributes and a system response corresponding to a specific utterance situation. That is, when a new scenario corresponding to the specific utterance situation is created, it suffices to define only a portion different from the scenario in one layer upper, as if an override in object-oriented programming Therefore, the burden of scenario preparation is reduced.

FIG. 4 illustrates another example of a plurality of scenarios that can correspond to the user utterance "Where am I now?". In this example, scenario B1 that can correspond to a plurality of user utterances including "Where am I now?" and a scenario B2 that is specialized for the user utterance "Where am I now?" are shown.

In each of these two scenarios, the scenario attributes include three data items such as sex, place, and weather. In scenario B1, a specific value "male" is designated for the sex, whereas a wild card "*" is designated for the place and the weather. Therefore, scenario B1 can be used regardless of the place and the weather when the sex corresponding to the utterance situation is "male". In scenario B2, the sex is "male", the place is "<park name>", and the weather is a wild card. The place "<park name>" indicates a superordinate concept (category) including a plurality of parks. In the embodiment, parentheses "< >" function as an identifier indicating a superordinate concept (category). Among scenarios B1 and B2, it can be said that scenario B1 is the first layer and scenario B2 is the second layer.

Based on the scenario attributes defined hierarchically as described above, when the utterance situation of the user utterance "Where am I now?" includes "male", "Ueno Park", and "sunny", a system utterance "Park" is output based on scenario B2. Also when the utterance situation includes "male", "Kenrokuen", and "rain", the system utterance "Park" is output based on scenario B2. When this utterance situation includes "male", "Ueno Zoo", and "sunny", a system utterance "Somewhere" is output based on scenario B1. Since scenario B2 is not applied unless the place corresponds to the park, it can be said that an application scene of scenario B2 is limited as compared with scenario B1.

Figure 5:
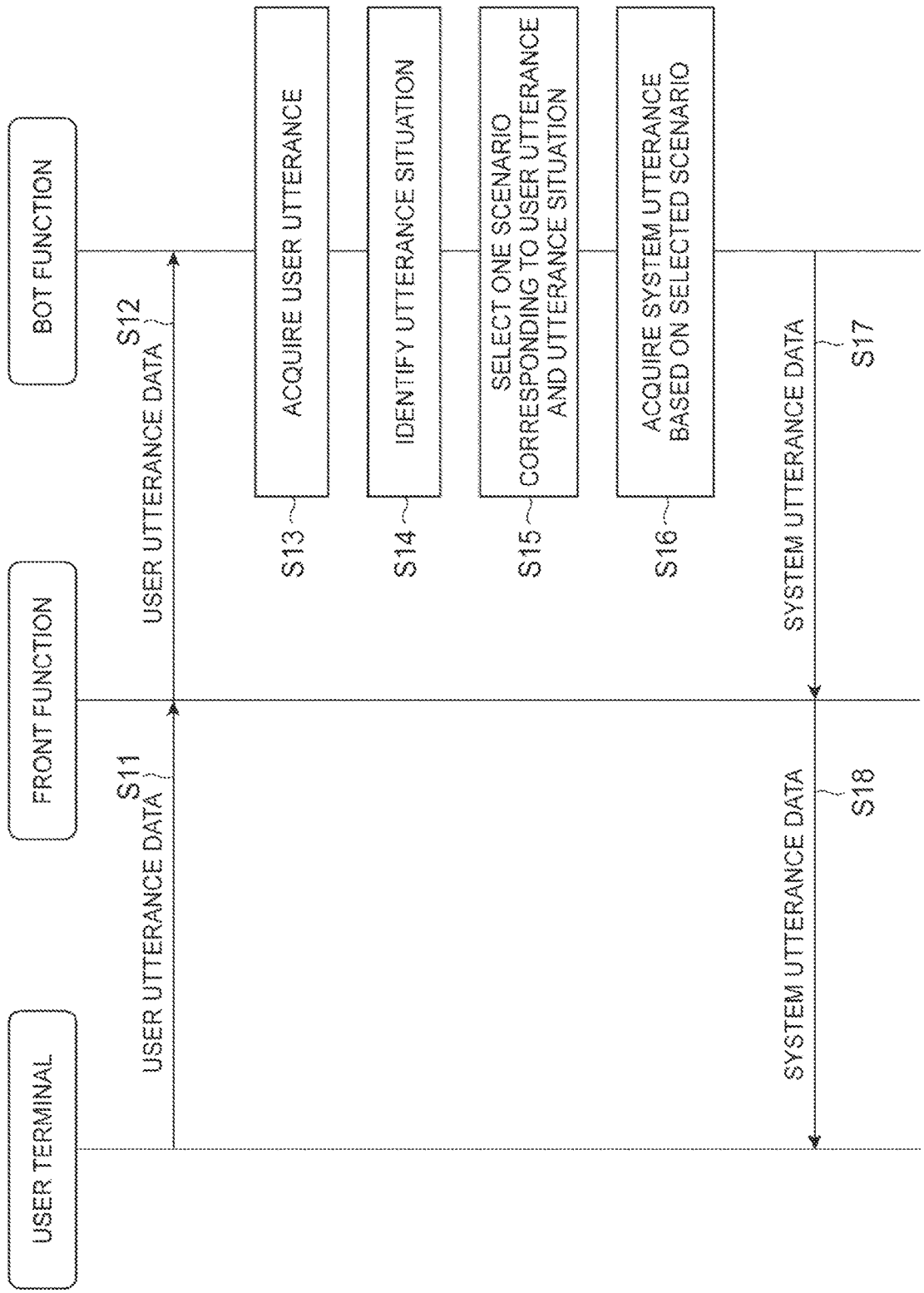
FIG. 5 is a sequence diagram illustrating an example of an operation of the dialogue device according to the embodiment.

An operation of the dialogue device 10 when an automatic dialogue is executed with the user terminal 90 will be described with reference to FIG. 5. FIG. 5 is a sequence diagram illustrating an example of the operation of the dialogue device 10. For ease of understanding, FIG. 5 individually illustrates the front function 20 and the bot function 30 of the dialogue device 10, and illustrates only one bot function 30.

In step S11, the user terminal 90 transmits user utterance data to the dialogue device 10. In the dialogue device 10, the front function 20 receives the user utterance data. The user utterance data is data including the user utterance and utterance attributes.

A user utterance acquisition method in the user terminal 90 is not limited. For example, the user terminal 90 may acquire a user utterance input by voice (that is, a user utterance represented by voice data), or may acquire a user utterance input by a character string (that is, a user utterance represented by text data). Alternatively, the user terminal 90 may automatically generate the user utterance in the form of voice data or text data based on a user instruction.

The utterance attributes are information indicating a nature or feature relevant to the user utterance, and can be used in an automatic dialogue. For example, the utterance attributes may be used to determine a system utterance. Specific content of the utterance attributes is not limited. For example, the utterance attributes may include a user attributes indicating a nature or feature of a user who wants to use the automatic dialogue and terminal attributes indicating a nature or feature of the user terminal 90. The type and number of data items indicating the user attributes are not limited. For example, the user attributes may be one selected from a name, a sex, an age, and an address, or may be a combination of two or more items arbitrarily selected from the four items. Alternatively, the user attributes may include one or more other data items different from the four items. The type and number of data items indicating the terminal attributes are not limited at all. For example, the terminal attributes may be one selected from a terminal name, an operating system name, and an operation mode, or may be a combination of two or more items arbitrarily selected from the three items. Alternatively, the terminal attributes may include one or more other data items different from the three items.

In step S12, the front function 20 determines the bot function 30 of processing the user utterance data, and transfers the user utterance data to the corresponding bot function 30. Thereafter, the respective functional elements of the bot function 30 cooperate to process the user utterance data.

In step S13, the acquisition unit 32 acquires the user utterance from the user utterance data.

In step S14, the identification unit 33 identifies a situation of the acquired user utterance as an utterance situation. A method for identifying the utterance situation is not limited. As an example, the identification unit 33 may identify the utterance situation by referring to at least some of the utterance attributes included in the user utterance data. For example, the identification unit 33 may identify a sex or age included in the utterance attributes as it is, as at least a part of the utterance situation. As another method, the identification unit 33 may identify the utterance situation from data other than the user utterance data. For example, the identification unit 33 may identify a date or time obtained from a timer in the dialogue device 10 as at least a part of the utterance situation. Alternatively, the identification unit 33 may acquire weather data from an arbitrary computer system (not illustrated) and identify the weather indicated by the weather data as at least a part of the utterance situation.

Alternatively, the identification unit 33 may identify data indicating an emotion of the bot function 30 as at least a part of the utterance situation. As yet another method, the identification unit 33 may identify the utterance situation using both the user utterance data and other data.

In step S15, the selection unit 34 selects one scenario corresponding to the user utterance and the utterance situation. The selection unit 34 searches for the scenario corresponding to the user utterance by referring to the scenario database 31.

When there is only one scenario defining the user utterance in the scenario database 31, the selection unit 34 selects the only scenario without using the utterance situation.

On the other hand, when two or more scenarios defining the user utterance are present in the scenario database 31, the selection unit 34 selects one scenario dynamically from the plurality of scenarios further using the utterance situation. In the embodiment, two or more scenarios defining the user utterances are also referred to as "candidate scenarios".

The selection unit 34 selects one scenario from the candidate scenarios based on a hierarchical relationship among the two or more scenario attributes defined in the two or more candidate scenarios and the utterance situation identified by the identification unit 33. Specifically, the selection unit 34 selects one scenario belonging to the lowest layer from among candidate scenarios corresponding to the utterance situation. For example, it is assumed that the two or more candidate scenarios include a first candidate scenario in which a scenario attribute indicating the first layer is defined, and a second candidate scenario in which a scenario attribute indicating the second layer is defined. In this case, the selection unit 34 selects the second candidate scenario when the utterance situation corresponds to the second layer, and selects the first candidate scenario when the utterance situation does not correspond to the second layer. When the scenario attributes include a plurality of data items each defined hierarchically, the selection unit 34 selects one scenario from two or more candidate scenarios based on a hierarchical relationship among respective data items of the two or more scenario attributes and the utterance situation. In short, the selection unit 34 selects one scenario in which the scenario attributes are most specifically defined among the candidate scenarios corresponding to the utterance situation.

A search scheme for selecting one scenario from a plurality of candidate scenarios is not limited. As an example, the selection unit 34 may select one scenario by comparing each data item of the two or more scenario attributes with the utterance situation in an arrangement order of the plurality of data items constituting the scenario attributes. Some specific examples of this process will be shown below.

It is assumed that scenarios A1, A2, and A3 illustrated in FIG. 3 are candidate scenarios. Further, it is assumed that an utterance situation including sex "male", age "25", and weather "sunny" is identified. The selection unit 34 first compares the sex, which is a first data item of the system attributes, with the sex of the utterance situation. Since all of three scenarios define "male", the selection unit 34 next compares the age, which is a second data item of the system attributes, with an age of the utterance situation. The age "25" of the utterance situation corresponds to a wild card (scenarios A1 and A3) and also corresponds to a more subordinate concept "20-39" (scenario A2) than the wild card. Accordingly, the selection unit 34 selects scenario A2 at this point of time. In this example, when the weather is the second data item, the selection unit 34 selects scenario A3.

It is assumed again that scenarios A1, A2 and A3 are candidate scenarios. Further, it is assumed that an utterance situation including sex "male", age "40", and weather "sunny" is identified. The selection unit 34 first compares the sex, which is the first data item of the system attributes, with the sex of the utterance situation, but cannot select one scenario at this stage. Then, the selection unit 34 compares the age, which is the second data item of the system attributes, with the age of the utterance situation. An age "40" of the utterance situation corresponds to a wild card (scenarios A1 and A3), but does not correspond to "20-39" (scenario A2). Therefore, the selection unit 34 selects scenarios A1 and A3 at this point of time, excluding scenario A2. Then, the selection unit 34 compares the weather that is a third data item of the system attributes with the weather of the utterance situation. The weather "sunny" of the utterance situation corresponds to a wild card (scenario A1) and also corresponds to "sunny" (scenario A3), which is a more subordinate concept than the wild card. Therefore, the selection unit 34 selects scenario A3 at this point of time.

Thus, the selection unit 34 may select one scenario by identifying the scenario attributes on the lowest layer corresponding to the utterance situation while referring to the plurality of candidate scenarios in parallel. It is assumed that each data item indicates one of a first value indicating the first layer and a second value indicating the second layer located lower than the first layer. In this case, the selection unit 34 may select a candidate scenario including the second value when the utterance situation corresponds to the second layer, and select a candidate scenario including the first value when the utterance situation does not correspond to the second layer. The selection unit 34 can finally select one scenario while repeating that process in an arrangement order of the plurality of data items.

Alternatively, the selection unit 34 may search for candidate scenarios in an order from the candidate scenario located on the lowest layer among the plurality of candidate scenarios (that is, search for the candidate scenarios while moving from the lowest layer to the top layer) to select a scenario corresponding to the utterance situation, which is a first found scenario.

Referring back to FIG. 5, in step S16, the selection unit 34 acquires a system utterance defined by the one selected scenario. In the examples of FIGS. 3 and 4, the system utterance is a fixed character string. Needless to say, at least a part of the system utterance may be dynamically set.

In step S17, the output unit 35 outputs system utterance data including the system utterance to the front function 20. A method of expressing the system utterance is not limited, similar to the user utterance. For example, the system utterance can be expressed by voice or text.

In step S18, the front function 20 transmits the system utterance data to the user terminal 90. The front function 20 may transmit the system utterance data after designating an output format of the system utterance (that is, after shaping the system utterance). The user terminal 90 receives and outputs the system utterance data, such that the user can recognize a reply of the bot to the user utterance.

The processes of steps S11 to S18 can be repeatedly executed. As described above, the bot function 30 selects the scenario according to the user utterance and the utterance situation, so that the system utterance according to the situation during the automatic dialogue is provided to the user.

The block diagram used for the description of the above embodiment illustrates blocks in units of functions. Functional blocks (constituent elements) thereof are realized by an arbitrary combination of hardware and/or software. Further, a means for realizing each functional block is not particularly limited. That is, each functional block may be realized by one physically and/or logically coupled device or may be realized by a plurality of devices in which two or more physically and/or logically separated devices may be connected directly and/or indirectly (for example, by a cable and/or wirelessly).

Figure 6:
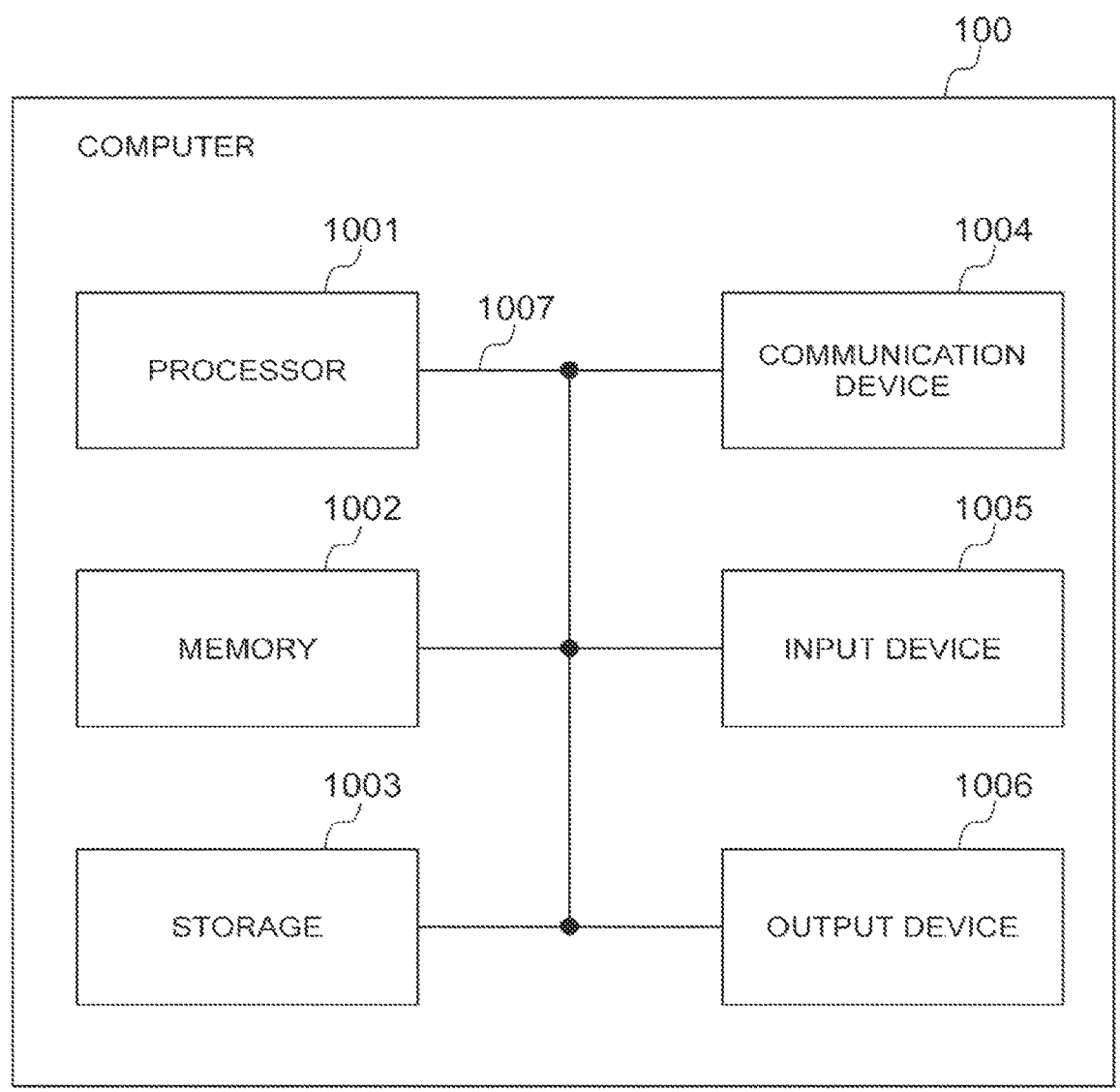
FIG. 6 is a diagram illustrating an example of a hardware configuration of a computer used for the dialogue device according to the embodiment.

For example, the dialogue device 10 according to an embodiment of the present invention may function as a computer that performs the process according to the embodiment. FIG. 6 is a diagram illustrating an example of a hardware configuration of a computer 100 functioning as the dialogue device 10. The computer 100 may physically include a processor 1001, a memory 1002, a storage 1003, a communication device 1004, an input device 1005, an output device 1006, a bus 1007, and the like.

In the following description, the term "device" can be read as a circuit, a device, a unit, or the like. The hardware configuration of the dialogue device 10 may be configured to include one or a plurality of illustrated devices, or may be configured without including some of the devices.

Each function in the dialogue device 10 is realized by loading predetermined software (a program) into hardware such as the processor 1001 or the memory 1002 so that the processor 1001 performs calculation to control communication that is performed by the communication device 1004 or reading and/or writing of data in the memory 1002 and the storage 1003.

The processor 1001, for example, operates an operating system to control the entire computer. The processor 1001 may be configured as a central processing unit (CPU) including an interface with a peripheral device, a control device, a calculation device, a register, and the like. For example, at least some of the functional elements of the dialogue device 10 may be realized by the processor 1001.

Further, the processor 1001 reads a program (program code), a software module, or data from the storage 1003 and/or the communication device 1004 to the memory 1002 and executes various processes according to the program, the software module, or the data. As the program, a program for causing the computer to execute at least part of the operation described in the above embodiment may be used. For example, at least some of the functional elements of the dialogue device 10 may be realized by a control program stored in the memory 1002 and operating on the processor 1001, or other functional blocks may be realized similarly. Although the case in which the various processes described above are executed by one processor 1001 has been described, the processes may be executed simultaneously or sequentially by two or more processors 1001. The processor 1001 may be implemented by one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement a wireless communication method according to the embodiment of the present invention.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc, a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a table including the memory 1002 and/or the storage 1003, a server, or another appropriate medium.

The communication device 1004 is hardware (a transmission and reception device) for performing communication between computers via a wired and/or wireless network and is also referred to as a network device, a network controller, a network card, or a communication module, for example. For example, at least some functional elements of the dialogue device 10 may be realized by the communication device 1004.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured as a single bus or may be configured as different buses between the devices.

Further, the computer 100 may include hardware such as a microprocessor, a digital signal processor (DSP), an application specific integrated circuit (ASIC), a programmable logic device (PLD), or a field programmable gate array (FPGA), and a part or all of each functional block may be realized by the hardware. For example, the processor 1001 may be implemented by at least one piece of the hardware.

As described above, the dialogue device according to the aspect of the present invention includes the acquisition unit that acquires the user utterance input by the user, the identification unit that identifies the situation of the user utterance as the utterance situation, the selection unit that selects the scenario corresponding to the user utterance from the database storing the plurality of scenarios, each of the plurality of scenarios defining the user utterance, the system utterance for the user utterance, and the hierarchically defined scenario attributes, and the output unit that outputs the system utterance defined by the scenario selected by the selection unit, and, when two or more scenarios defining the user utterance acquired by the acquisition unit are present as candidate scenarios in the database, the selection unit selects one scenario from the two or more candidate scenarios based on the hierarchical relationship among the two or more scenario attributes defined in the two or more candidate scenarios and the utterance situation.

In such an aspect, when there are a plurality of scenarios in which the same user utterance is defined, one scenario is selected based on the situation of the user utterance and individual scenario attributes, and the system utterance is output according to the selected scenario. It is therefore possible to realize a flexible automatic dialogue according to the situation of the user utterance. In addition, for prepared scenarios, since it suffices to define a correspondence relationship among the user utterance, the system utterance, and the scenario attributes, it is possible to reduce the burden of scenario preparation. Further, since the scenario attributes are defined hierarchically, the scenarios can be created and selected efficiently. As a result, it becomes possible to curb a usage amount of hardware resources of the dialogue device (for example, a processor load and a memory consumption amount).

In a dialogue device according to another aspect, the two or more candidate scenarios may include the first candidate scenario in which the scenario attributes indicating the first layer has been defined, and the second candidate scenario in which the scenario attributes indicating the second layer located below the first layer has been defined, and the selection unit may select the second candidate scenario when the utterance situation corresponds to the second layer, and select the first candidate scenario when the utterance situation does not correspond to the second layer. It is possible to output the system utterance suitable for a situation of an automatic dialogue by selecting a scenario in which a scenario attribute with a more subordinate concept has been defined.

In the dialogue device according to the other aspect, the scenario attributes may include a plurality of data items each defined hierarchically, and the selection unit may select one scenario from two or more candidate scenarios based on a hierarchical relationship among respective data items of the two or more scenario attributes and the utterance situation. It is possible to output the system utterance suitable for a situation of an automatic dialogue by considering the hierarchical relationship among the individual data items of the scenario attributes.

In the dialogue device according to the other aspect, the selection unit may select one scenario from two or more candidate scenarios by comparing each data item of two or more scenario attributes with the utterance situation in an arrangement order of a plurality of data items. Using a simple method of performing the comparison in the arrangement order of the data items, it is possible to simply select one scenario while curbing a usage amount of hardware resources of the dialogue device.

In the dialogue device according to the other aspect, each data item may indicate one of the first value indicating the first layer and the second value indicating the second layer located lower than the first layer, and the selection unit may select the candidate scenario including the second value when the utterance situation corresponds to the second layer, and select the candidate scenario including the first value when the utterance situation does not correspond to the second layer. It is possible to output a system utterance suitable for a situation of an automatic dialogue by selecting a scenario in which a scenario attribute including a value corresponding to a more subordinate concept is defined.

In the dialogue device according to the other aspect, the top layer of the scenario attributes may be defined using a wild card. Using a wild card, it is possible to select any scenario even when an utterance situation not assumed at the time of scenario creation has occurred. As a result, it is possible to reliably respond to the user utterance.

Although the present invention has been described in detail above, it is apparent to those skilled in the art that the present embodiment is not limited to the embodiment described in the present specification. The present embodiment can be implemented as a modified and changed aspect without departing from the spirit and scope of the present invention defined by the description of the claims. Accordingly, the description of the present specification is intended for the purpose of illustration and does not have any restrictive meaning with respect to the present embodiment.

Notification of information is not limited to the aspect and embodiment described in the present specification and may be made by another method. For example, notification of information may be made by physical layer signaling (for example, downlink control information (DCI) or uplink control information (UCI)), upper layer signaling (for example, radio resource control (RRC) signaling, medium access control (MAC) signaling, or annunciation information (master information block (MIB) or system information block (SIB))), another signal, or a combination of them. Further, RRC signaling may be called an RRC message, and may be, for example, an RRC connection setup message or an RRC connection reconfiguration message.

Further, each aspect/embodiment described in the present specification may be applied to long term evolution (LTE), LTE advanced (LTE-A), SUPER 3G IMT-Advanced, 4G, 5G, future radio access (FRA), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, ultra wide band (UWB), Bluetooth (registered trademark), a system using another appropriate system, and/or a next generation system extended based on these systems.

A process procedure, a sequence, a flowchart, and the like in each aspect/embodiment described in the present specification may be in a different order unless inconsistency arises. For example, for the method described in the present specification, elements of various steps are presented in an exemplified order, and the elements is not limited to the presented specific order.

Information or the like can be output from an upper layer (or a lower layer) to the lower layer (or the upper layer). The information or the like may be input and output through a plurality of network nodes.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present specification may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless of whether the software may be called software, firmware, middleware, microcode, or hardware description language or called another name.

Further, software, instructions, and the like may be transmitted and received via a transmission medium. For example, when software is transmitted from a website, a server, or another remote source using wired technology such as a coaxial cable, an optical fiber cable, a twisted pair and a digital subscriber line (DSL) and/or wireless technology such as infrared rays, radio, and microwaves, those wired technology and/or wireless technology are included in the definition of the transmission medium.

The information, signals, and the like described in the present specification may be represented by any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

The terms described in the present specification and/or terms necessary for understanding of the present specification may be replaced by terms having the same or similar meanings.

The terms "system" and "network" used in the present specification are used interchangeably with each other.

Further, information, parameters, and the like described in the present specification may be represented by an absolute value, may be represented by a relative value from a predetermined value, or may be represented by corresponding different information. For example, radio resources may be indicated by an index.

The names used for the above-described parameters are not definitive in any way. Further, mathematical expressions and the like using those parameters are different from those explicitly disclosed in the present specification in some cases. Because various channels (for example, PUCCH and PDCCH) and information elements (for example, TPC) can be identified by every appropriate names, various names assigned to such various channels and information elements are not definitive in any way.

A user terminal and a mobile communication terminal may be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by a person of ordinary skill in the art.

The term "determining" used in the present specification may include a variety of operations. The "determining" can include, for example, regarding judging, calculating, computing, processing, deriving, investigating, looking up (for example, looking up in a table, a table or another data structure), or ascertaining as "determining". Further, "determining" can include, for example, regarding receiving (for example, receiving information), transmitting (for example, transmitting information), inputting, outputting, or accessing (for example, accessing data in a memory) as "determining". Further, "determining" can include regarding resolving, selecting, choosing, establishing, comparing or the like as "determining". That is, "determining" can include regarding a certain operation as "determining".

The terms "connected", "coupled", or any modification thereof means any direct or indirect connection or coupling between two or more elements, and can include the presence of one or more intermediate elements between two elements "connected" or "coupled" to each other. The coupling or connection between elements may be physical, may be logical, or may be a combination thereof. When used in the present specification, two elements can be considered to be "connected" or "coupled" to each other by using one or more wires, cables, and/or printed electrical connections, or by using electromagnetic energy such as electromagnetic energy having wavelengths in a radio frequency region, a microwave region, and a light (both visible and invisible) region as some non-limiting and non-comprehensive examples.

The description "based on" used in the present specification does not mean "based only on" unless otherwise noted. In other words, the description "based on" means both of "based only on" and "based at least on".

When terms such as "first" and "second" have been used in the present specification, any reference to elements thereof does not generally limit an amount or order of the elements. These terms can be used in the present specification as a convenient way to distinguish between two or more elements. Thus, the reference to the first and second elements does not mean that only two elements can be adopted there or that the first element has to precede the second element in some way.

As long as "include", "including" and transformation of them are used in the present specification or claims, those terms are intended to be comprehensive like the term "comprising". Further, the term "or" used in the present specification or claims is intended not to be exclusive OR.

Throughout the present disclosure, it is assumed that a plurality of things are included unless a single thing is clearly indicated by the context or technically.

REFERENCE SIGNS LIST

10: Dialogue device
20: Front function
30: Bot function
31: Scenario database
32: Acquisition unit
33: Identification unit
34: Selection unit
35: Output unit
90: User terminal

The invention claimed is:

1. A dialogue device comprising circuitry configured to:
acquire a user utterance input by a user;
identify a situation of the user utterance as an utterance situation, the utterance situation being at least one of user attributes and environmental information;
select a scenario corresponding to the user utterance from a database storing a plurality of scenarios, each of the plurality of scenarios defining a user utterance, a system utterance for the user utterance, and hierarchically defined scenario attributes; and
output the system utterance defined by the selected scenario,
wherein, when two or more scenarios defining the acquired user utterance are present as candidate scenarios in the database, the circuitry selects one scenario from the two or more candidate scenarios based on a hierarchical relationship among the two or more scenario attributes defined in the two or more candidate scenarios and the utterance situation,
the scenario attributes include a plurality of data items each defined hierarchically,
the circuitry selects the one scenario from the two or more candidate scenarios based on a hierarchical relationship among the respective data items of the two or more scenario attributes and the utterance situation, and
the circuitry selects the one scenario from the two or more scenarios by comparing each data item of the two or more scenario attributes with the utterance situation in an arrangement order of the plurality of data items.

2. The dialogue device according to claim 1,
wherein the two or more candidate scenarios include a first candidate scenario in which the scenario attributes indicating a first layer has been defined, and a second candidate scenario in which the scenario attributes indicating a second layer located lower than the first layer has been defined, and
the circuitry selects the second candidate scenario when the utterance situation corresponds to the second layer, and selects the first candidate scenario when the utterance situation does not correspond to the second layer.

3. The dialogue device according to claim 1,
wherein each data item indicates one of a first value indicating the first layer and a second value indicating the second layer located lower than the first layer,
the circuitry selects the candidate scenario including the second value when the utterance situation corresponds to the second layer, and selects the candidate scenario including the first value when the utterance situation does not correspond to the second layer.

4. The dialogue device according to claim 1, wherein a top layer of the scenario attributes is defined using a wild card.

5. The dialogue device according to claim 2,
wherein the scenario attributes include a plurality of data items each defined hierarchically, and
the circuitry selects the one scenario from the two or more candidate scenarios based on a hierarchical relationship among the respective data items of the two or more scenario attributes and the utterance situation.

6. A method implemented by circuitry of a dialogue device, the method comprising:
acquiring a user utterance input by a user;
identifying a situation of the user utterance as an utterance situation, the utterance situation being at least one of user attributes and environmental information;
selecting a scenario corresponding to the user utterance from a database storing a plurality of scenarios, each of the plurality of scenarios defining a user utterance, a system utterance for the user utterance, and hierarchically defined scenario attributes; and
outputting the system utterance defined by the selected scenario,
wherein, when two or more scenarios defining the acquired user utterance are present as candidate scenarios in the database, the method includes selecting one scenario from the two or more candidate scenarios based on a hierarchical relationship among the two or more scenario attributes defined in the two or more candidate scenarios and the utterance situation,
the scenario attributes include a plurality of data items each defined hierarchically, and
the method includes
selecting the one scenario from the two or more candidate scenarios based on a hierarchical relationship among the respective data items of the two or more scenario attributes and the utterance situation, and
selecting the one scenario from the two or more scenarios by comparing each data item of the two or more scenario attributes with the utterance situation in an arrangement order of the plurality of data items.

* * * * *